US011053653B2

(12) United States Patent
Jensen

(10) Patent No.: US 11,053,653 B2
(45) Date of Patent: Jul. 6, 2021

(54) CATHODIC PROTECTION FOR OFFSHORE WIND TURBINE STEEL SUPPORT STRUCTURES

(71) Applicant: Ørsted Wind Power A/S, Fredericia (DK)

(72) Inventor: Birit Buhr Jensen, Gentofte (DK)

(73) Assignee: Ørsted Wind Power A/S (*) Notice: Subject to any disclaimer, the term of this patent is extended or adjusted under 35 U.S.C. 154(b) by 0 days.

(21) Appl. No.: 16/634,877

(22) PCT Filed: Jul. 27, 2018

(86) PCT No.: PCT/EP2018/070457
§ 371 (c)(1),
(2) Date: Jan. 28, 2020

(87) PCT Pub. No.: WO2019/025316
PCT Pub. Date: Feb. 7, 2019

(65) Prior Publication Data
US 2020/0232103 A1 Jul. 23, 2020

(30) Foreign Application Priority Data

Aug. 4, 2017 (EP) .................................... 17184975

(51) Int. Cl.
E02B 17/00 (2006.01)
C23F 13/02 (2006.01)
(Continued)

(52) U.S. Cl.
CPC .......... E02B 17/0026 (2013.01); C23F 13/04 (2013.01); C23F 13/22 (2013.01);
(Continued)

(58) Field of Classification Search
CPC ............. E02B 17/0026; E02B 17/0017; E02B 2017/0091; C23F 13/02; C23F 13/04; C23F 13/08; C23F 13/20; F03D 13/25
See application file for complete search history.

(56) References Cited

U.S. PATENT DOCUMENTS 3,714,004 A * 1/1973 Riggs, Jr. ................ C23F 13/04
205/727
4,089,767 A * 5/1978 Sabins .................... C23F 13/02
204/196.07
(Continued)

FOREIGN PATENT DOCUMENTS

CN 102677066 A 9/2012
CN 104357853 A 2/2015
(Continued)

OTHER PUBLICATIONS

CN102677066A, Google Patent Translation (Year: 2012).*
(Continued)

Primary Examiner — Frederick L Lagman
(74) Attorney, Agent, or Firm — Condo Roccia Koptiw LLP

(57) ABSTRACT

Disclosed is a support system (100) for supporting an offshore wind turbine comprising a steel support structure (180) for supporting the offshore wind turbine and a cathodic protection system (101-105) configured to protect the steel support structure from corrosion. The cathodic protection system comprising one or more galvanic anodes (101) arranged in connection with the steel support structure and a first electrical connection (102) electrically connecting the one or more galvanic anodes to the steel support structure. This allows the steel support structure to be polarized by the electrons flowing from the one or more galvanic anodes to the steel support structure. The first electrical connection is an adaptable electrical connection that can change the rate of
(Continued)

electrons flowing from the one or more galvanic anodes to the steel support structure and thereby change the polarization of the steel support structure.

20 Claims, 2 Drawing Sheets

(51) Int. Cl.
    *F03D 13/25*     (2016.01)
    *C23F 13/22*     (2006.01)
    *C23F 13/04*     (2006.01)

(52) U.S. Cl.
    CPC .......... *F03D 13/25* (2016.05); *C23F 2213/31* (2013.01); *E02B 2017/0091* (2013.01)

(56) References Cited

U.S. PATENT DOCUMENTS

| | | | | |
|---|---|---|---|---|
| 4,351,703 A * | 9/1982 | Winslow, Jr. | ......... | G01N 17/02 |
| | | | | 204/404 |
| 4,381,981 A * | 5/1983 | Maes | ......... | G01R 17/06 |
| | | | | 204/196.04 |
| 4,484,839 A * | 11/1984 | Nandlal | ......... | E02B 17/0026 |
| | | | | 204/196.18 |
| 4,484,840 A * | 11/1984 | Nandlal | ......... | E02B 17/0026 |
| | | | | 204/196.18 |
| 4,544,465 A * | 10/1985 | Marsh | ......... | E02B 17/0026 |
| | | | | 204/196.18 |
| 4,591,792 A * | 5/1986 | Birchmeier | ......... | G01N 17/02 |
| | | | | 324/425 |
| 4,639,677 A * | 1/1987 | Goolsby | ......... | C23F 13/04 |
| | | | | 204/196.07 |
| 4,941,775 A * | 7/1990 | Benedict | ......... | C23F 13/02 |
| | | | | 204/196.17 |
| H1644 H * | 5/1997 | Muehl, Sr. | ......... | C23F 13/04 |
| | | | | 204/196.05 |
| 7,230,347 B2 * | 6/2007 | Brown | ......... | C23F 13/04 |
| | | | | 290/55 |
| 2007/0023295 A1 * | 2/2007 | Dowling | ......... | C23F 13/14 |
| | | | | 205/724 |
| 2014/0262822 A1 * | 9/2014 | Knoeppel | ......... | C23F 13/22 |
| | | | | 205/726 |
| 2014/0321838 A1 * | 10/2014 | Farris | ......... | F24H 9/0047 |
| | | | | 392/441 |
| 2014/0332373 A1 * | 11/2014 | Prigent | ......... | C23F 13/08 |
| | | | | 204/196.01 |
| 2015/0368809 A1 * | 12/2015 | Atkins | ......... | C23F 13/22 |
| | | | | 205/728 |

FOREIGN PATENT DOCUMENTS

| | | |
|---|---|---|
| WO | WO 2009/157816 A1 | 12/2009 |
| WO | WO 2017/199059 A2 | 11/2017 |
| WO | WO 2018/054915 A1 | 3/2018 |

OTHER PUBLICATIONS

Database WPI Week 201526. Thomson Scientific, London, GB; AN 2015-22894H XP002786031.

Anonymous: 11 Cathodic protection and corrosion control for offshore wind turbines and wind farms11, Deepwater Corrosion Services Inc. Dec. 14, 2011 (Dec. 14, 2011), pp. 1-1, XP055038291,Retrieved from the Internet: http://www.stoprust.com/turbinecp.htm [retrieved on Sep. 17, 2012] the whole document.

Database WPI Week 201308. Thomson Scientific, London, GB; AN 2012-R39429 XP002786030.

* cited by examiner

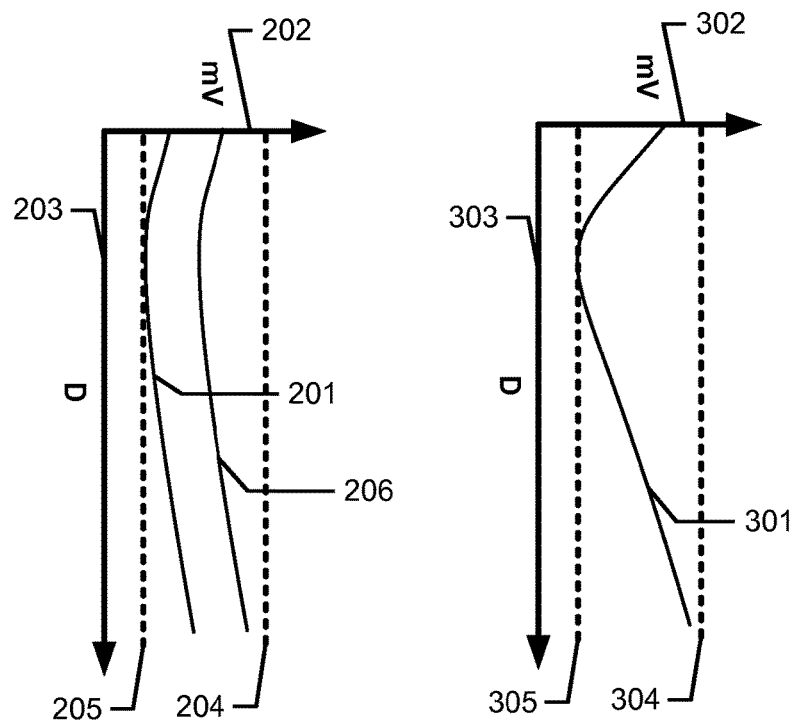
Fig. 2
Fig. 3
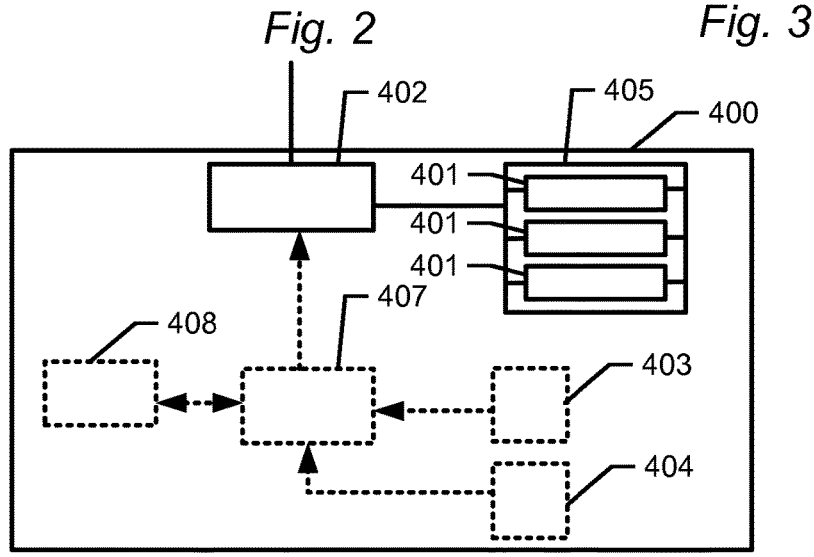
Fig. 4
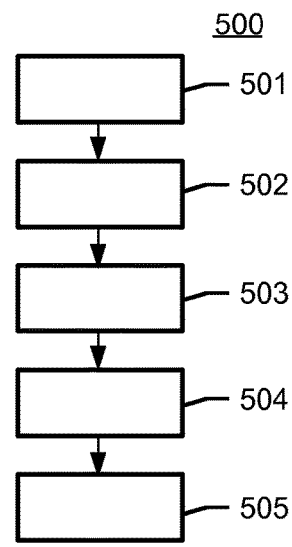
Fig. 5

CATHODIC PROTECTION FOR OFFSHORE WIND TURBINE STEEL SUPPORT STRUCTURES

CROSS REFERENCE TO RELATED APPLICATIONS

This application is the National Stage Entry under 35 U.S.C. § 371 of Patent Cooperation Treaty Application No. PCT/EP2018/070457, filed 27 Jul. 2018, which claims priority from European Application No. 17184975.5, filed 4 Aug. 2017, the contents of which are hereby incorporated by reference herein.

FIELD

The present invention relates to a support system for an offshore wind turbine and to a cathodic protection system.

BACKGROUND

Offshore wind has proven to be an effective way of producing electricity. It is however challenging to provide a secure foundation for supporting the wind turbine. The task is not made easier by the fact that the requested lifetime of the foundation typically is more than 25 years.

Steel support structures are commonly used to support offshore wind turbines. The steel support structures are however deteriorated in a number of ways. One of the most critical being corrosion. Seawater, compared to fresh water increases the corrosion rate. Salts in seawater (electrolyte) increases the conductivity of the electrolyte.

To protect the steel support structures against corrosion cathodic protection systems comprising one or more galvanic anodes are often used. The galvanic anodes are made of a more electrochemical active material than the steel support structure. When the galvanic anode is connected to the structure, an electrical circuit is established, running as ion current in the seawater and electrical current in the metal connection. Thereby the anode will sacrifice itself, and as a result the galvanic anodes are consumed. The structure to be protected polarises towards more negative values, and is hence polarised.

Adequate protection according to norms and standards (EN12495, DNV-RP-B401 for instance) in an aerobic environment is when the structure to electrolyte potential is below −800 mV vs a Ag/AgCl/seawater reference electrode.

Often, anodes are distributed unevenly over the surface of the steel support structure, and there will be a more negative structure to electrolyte potential close to the anodes compared to far from the anodes. The structure to electrolyte potential close to a galvanic anode made of aluminium is approx. −1050 mV vs Ag/AgCl/seawater reference electrode.

To protect the steel support structure over time new galvanic anodes may be installed when the old galvanic anodes have been partially or fully consumed. This is however a complex and expensive operation offshore.

Thus, it remains a problem to provide a cathodic protection system that requires less maintenance.

SUMMARY

According to a first aspect, the invention relates to a support system for supporting an offshore wind turbine comprising a steel support structure for supporting the offshore wind turbine and a cathodic protection system configured to protect the steel support structure from corrosion, the cathodic protection system comprising one or more galvanic anodes arranged in connection with the steel support structure and a first electrical connection electrically connecting the one or more galvanic anodes to the steel support structure whereby the steel support structure can be polarized by the electrons flowing from the one or more galvanic anodes to the steel support structure, wherein the first electrical connection is an adaptable electrical connection that can change the rate of electrons flowing from the one or more galvanic anodes to the steel support structure and thereby change the polarization of the steel support structure.

Consequently, by having an adaptable electrical connection the polarization can be tailored to the specific needs, whereby the amount of anode material emitted to the water can be lowered. This will increase the life time of the one or more galvanic anodes and further lower the environmental impact of the cathodic protection system.

The steel support structure may be a foundation monopile, a space frame structure e.g. a jacket or a tripod, a compliant tower, a gravity structure or a floating structure for an offshore structure such as a TLP (tension leg platform), a Semi-Submersible, a spar platform or a tri-pile. The cathodic protection system may comprise a plurality of galvanic anodes arranged in an anode cage surrounding the steel support structure. The galvanic anode may be an alloy founded using different metals. The galvanic anode may be based on aluminium and/or zinc.

In some embodiments, the cathodic protection system further comprises a control unit operationally connected to the first electrical connection and configured to control the first electrical connection and thereby change the polarization of the steel support structure.

Consequently, the first electrical connection may be controlled in a simple manner.

The control unit may be configured to control the first electrical connection in response to sensor signals received from one or more sensors or in response to control signals received from an external source. The cathodic protection system may further be configured to periodically measure the electrical current through the first electrical connection e.g. the control unit may be configured to periodically measure the electrical current through the first electrical connection. The control unit may be configured to estimate the amount of metal released to the sea from the galvanic anodes by analysing the periodic measurements of the electrical current e.g. the control unit may estimate the total charge that has moved through the first electrical connection, e.g. by numerically integrating the periodic measurements of the electrical current. The total charge that has moved through the first electrical connection has a linear relationship with the amount of metal released to the sea from the galvanic anodes.

In some embodiments, the first electrical connection is adaptable by comprising at least one electrical component having a plurality of states.

The at least one electrical component may be selected from the list of electrical components consisting of: a variable resistor and an electrical switch. The first electrical connection may comprise a voltage regulator such as a linear voltage regulator or a switched voltage regulator.

In some embodiments, the cathodic protection system further comprises a first reference electrode arranged in connection with the steel support structure at a first position, and wherein the control unit is further operationally connected to the first reference electrode and configured to control the first electrical connection in response to the electrochemical potential measured with the first reference electrode.

Consequently, the polarization of the steel support structure may effectively be controlled. This may allow the cathodic protection system to take account of changes of the steel support structure e.g. deterioration of a coating of the steel support structure.

The control unit may be configured to control the first electrical connection so that the protective potential of the steel support structure is below a predetermined threshold.

The first reference electrode may be a Ag/AgCl/seawater reference electrode. The control unit may be configured to control the first electrical connection dependent on the electrochemical potential measured with the first reference electrode and the spatial position of the first reference electrode e.g. if the first reference electrode is positioned close to one or more galvanic anodes the predetermined threshold may be lower than when the first reference electrode is positioned further away from the one or more galvanic anodes to take account of spatial variation of the polarization of the steel support structure as explained in relation to FIGS. 2 and 3. The predetermined threshold may periodically be updated based on the state of the steel support structure and/or electrochemical potentials measured with other reference electrodes e.g. in a calibration procedure another reference electrode may be moved down along the steel support structure to determine a function specifying the spatial distribution of the electrochemical polarization of the steel support structure e.g. as shown in FIG. 2 or 3, wherein the predetermined threshold is determined based on the determined function so that every parts of the steel support structure are effectively polarized. The first reference electrode is configured to measure the electrochemical potentials between the steel support structure and the first reference electrode. The first reference electrode may be permanently attached to the steel support structure. The first reference electrode is preferably attached directly on the steel support structure to avoid error sources such as effects from the electrical resistance of the water or fouling/marine growth on the steel support structure.

In some embodiments, the cathodic protection system further comprises a second reference electrode arranged in connection with the steel support structure at a second position, and wherein the control unit is further operationally connected to the second reference electrode and configured to control the first electrical connection in response to the electrochemical potential measured with both the first reference electrode and the second reference electrode.

Consequently, spatial variation of the polarization of the steel support structure may be accounted for. This allows the control unit to take spatial variation into account and optimise the first electrical connection more precisely.

The cathodic protection system may comprise more than two reference electrodes e.g. at least 3, 4 or 5 reference electrodes. In some embodiments, at least one reference electrode is arranged in water and at least one reference electrode is arranged below the seabed. In some embodiments, at least one reference electrode is arranged in a hollow inside of the steel support structure. The first reference electrode may be arranged at a first depth and the second reference electrode may be arranged at a second depth different from the first depth. The control unit may be configured to control the first electrical connection so that the electrochemical potential measured with the first reference electrode is below a threshold for the first reference electrode and/or the electrochemical potential measured with the second reference electrode is below a threshold for the second reference electrode. The threshold for the first reference electrode and the threshold for the second reference electrode are preferably different. The threshold for the first reference electrode may be selected dependent on the spatial position of the first reference electrode. The threshold for the first reference electrode may depend on measurement performed with another reference electrode e.g. the second reference electrode. The threshold for the second reference electrode may be selected dependent on the spatial position of the second reference electrode. The threshold for the second reference electrode may depend on measurement performed with another reference electrode e.g. the first reference electrode.

The threshold for the second reference electrode may dependent on the difference between the electrochemical potential measured with the first reference electrode and the electrochemical potential measured with the second reference electrode e.g. if the second reference electrode is arranged with a greater distance to the one or more galvanic anodes than the first reference electrode, then a big difference between the two electrochemical potentials may be indicative of a spatial distribution of the electrochemical polarization as shown in FIG. 3, whereas if the difference is smaller then it may be indicative of a spatial distribution of the electrochemical polarization as shown in FIG. 2. Thus, the second threshold may be lower when the difference between the two electrochemical potentials are large compared to the situation when the difference is smaller to make sure that also the parts of the steel support structure furthest away from the one or more galvanic anodes are effectively polarized and thereby protected from corrosion.

The first reference electrode is configured to measure the electrochemical potentials between the steel support structure and the first reference electrode. The second reference electrode is configured to measure the electrochemical potentials between the steel support structure and the second reference electrode. The first and second reference electrodes may be permanently attached to the steel support structure. The first and second reference electrodes are preferably attached directly on the steel support structure to avoid error sources such as effects from the electrical resistance of the water or fouling on the steel support structure.

In some embodiments, the control unit is configured to estimate a first function based on the electrochemical potential measured with both the first reference electrode and the second reference electrode and control the first electrical connection based on the first function.

The first function may specify the spatial distribution of the electrochemical polarization of the steel support structure. The spatial distribution of the electrochemical polarization may be assumed to be only dependent on the water depth relative to the anode position, i.e. a function with a single variable (the depth relative to the anode location) may specify the electrochemical polarization. The control unit may have access to first data specifying typical spatial distributions of the electrochemical polarization, and wherein the control unit uses the first data (in addition to the electrochemical potential measured with the first reference electrode and the second reference electrode) to estimate the first function.

In some embodiments, the control unit is configured to control the first electrical connection so that the first function is below a predetermined threshold.

The predetermined threshold may be found by using corrosion coupons e.g. gravimetric coupons or electrical resistance coupons, providing information on when corrosion ceases relative to polarization.

In some embodiments, the control unit further has access to auxiliary data related to the spatial distribution of the electrochemical polarization, and wherein the control unit is configured to control the first electrical connection in response to the auxiliary data, the electrochemical potential measured with the first reference electrode and/or the second reference electrode.

The auxiliary data may be indicative of the state of a coating on the steel support structure.

In some embodiments, the cathodic protection system further comprises a communication unit operationally connected to the control unit.

The communication unit may be configured to receive control signals from an external source such as an operator located onshore or on a ship. The control unit may be configured to control the first electrical connection in response to control signals received by the communication unit. The communication unit may be a wireless or wired communication unit. The communication unit may communicate directly with an operator or via another communication unit arranged in connection with the support system. The communication unit may be configured to transmit data to a remote receiver. The data may comprise data indicative of measurements made with one or more reference electrodes of the cathodic protection system.

In some embodiments, the control unit is configured to control the communication unit to transmit a message to a remote receiver if an error or potential future error has been identified.

Examples of errors are: failure of a reference electrode, failure of the first electrical connection, partial or full consumption of one or more galvanic anodes.

In some embodiments, the steel support structure has one or more walls surrounding a hollow interior, the one or more walls having a first opening, the one or more galvanic anodes being arranged on the outside of the steel support structure, and wherein the first electrical connection comprises a first electrical cable electrically connected at a first end to the one or more galvanic anodes and extending into the hollow interior through the first opening, wherein the first electrical cable is electrically isolated from the first opening of the steel support structure and electrically connected to another part of the first electrical connection arranged in the hollow interior.

This allows the active parts of the cathodic protection system such as switches, variable resistors, and control units to be arranged in the inside of the steel support structure and thereby be better protected. This may also make it easier to install the adjustable cathodic protection system, as more elements of the system may be pre-installed before the support structure is inserted into the seabed. The parts of the cathodic protection system arranged inside the steel support structure may be arranged at the same depth as the one or more galvanic anodes arranged outside the steel support structure. Alternatively, the parts of the cathodic protection system arranged inside the steel support structure may be arranged above water. According to a second aspect the invention relates to a cathodic protection system for protecting a steel support structure for supporting an offshore wind turbine against corrosion, comprising one or more galvanic anodes for being arranged in connection with the steel support structure and a first electrical connection for electrically connecting the one or more galvanic anodes to the steel support structure whereby the steel support structure can be polarized by the electrons flowing from the one or more galvanic anodes to the steel support structure wherein the first electrical connection is an adaptable electrical connection that can change the rate of electrons flowing from the one or more galvanic anodes to the steel support structure and thereby change the polarization of the steel support structure.

In some embodiments, the cathodic protection system further comprises a control unit operationally connectable to the first electrical connection and configured to control the first electrical connection and thereby change the polarization of the steel support structure.

In some embodiments, the first electrical connection is adaptable by comprising at least one electrical component having a plurality of states.

In some embodiments, the cathodic protection system further comprises a first reference electrode arranged in connection with the steel support structure at a first position, and wherein the control unit is further operationally connectable to the first reference electrode and configured to control the first electrical connection in response to the electrochemical potential measured with the first reference electrode.

In some embodiments, the cathodic protection system further comprises a second reference electrode for being arranged in connection with the steel support structure at a second position, and wherein the control unit is further operationally connectable to the second reference electrode and configured to control the first electrical connection in response to the electrochemical potential measured with both the first reference electrode and the second reference electrode.

In some embodiments, the control unit is configured to estimate a first function based on the electrochemical potential measured with both the first reference electrode and the second reference electrode and control the first electrical connection based on the first function.

The first function may specify the spatial distribution of the electrochemical polarization of the steel support structure. The spatial distribution of the electrochemical polarization may be assumed to be only dependent on the depth, i.e. a function with a single variable (the depth relative to anode location) may specify the electrochemical polarization. The control unit may have access to first data specifying typical spatial distributions of the electrochemical polarization, and wherein the control unit uses the first data to estimate the first function.

In some embodiments, the control unit is configured to control the first electrical connection so that the first function is below a predetermined threshold.

The predetermined threshold may be found by using corrosion coupons providing information on when corrosion ceases relative to polarization.

In some embodiments, the control unit may further have access to auxiliary data related to the spatial distribution of the electrochemical polarization, and wherein the control unit is configured to control the first electrical connection in response to the auxiliary data, the electrochemical potential measured with the first reference electrode and/or the second reference electrode.

The auxiliary data may indicate the state of a coating of the steel support structure.

In some embodiments, the cathodic protection system further comprises a communication unit operationally connected to the control unit.

The communication unit may be configured to receive control signals from an external source such as an operator located onshore or on a ship. The control unit may be configured to control the first electrical connection in response to control signals received by the communication unit. The communication unit may be a wireless or wired communication unit. The communication unit may communicate directly with an operator or via another communication unit arranged in connection with the support system. The communication unit may be configured to transmit data to a remote receiver. The data may comprise data indicative of measurements made with one or more reference electrodes of the cathodic protection system.

In some embodiments, the control unit is configured to control the communication unit to transmit a message to a remote receiver if an error or potential future error has been identified.

Examples of errors are: failure of a reference electrode, failure of the first electrical connection, partial or full consumption of one or more galvanic anodes.

In some embodiments, the first electrical connection comprises a first electrical cable electrically connected at a first end to the one or more galvanic anodes and being configured to extend into a hollow interior of the steel support structure through a first opening, wherein the first electrical cable is configured to be electrically isolated from the first opening of the steel support structure and electrically connected to another part of the first electrical connection configured to be arranged in the hollow interior.

According to a third aspect, the invention relates to the use of a cathodic protection system as disclosed in relation to the second aspect of the invention for protecting a steel support structure supporting an offshore wind turbine against corrosion.

According to a fourth aspect, the invention relates to a method for protecting a steel support structure against corrosion, the steel support structure being configured to support an offshore wind turbine, the method comprising the steps of:
 obtaining a cathodic protection system as disclosed in relation to the second aspect of the invention and/or FIG. 4;
 arranging the cathodic protection system in connection with the steel support structure;
 electrically connecting the one or more galvanic anodes of the cathodic protection system to the steel support structure using the first electrical connection of the cathodic protection system;
 measuring one or more electrochemical potentials between the steel support structure and one or more reference electrodes;
 using the measured one or more electrochemical potentials to adapt the first electrical connection of the cathodic protection system.

In some embodiments, a plurality of steel support structures, preferably arranged in proximity of each other e.g. in an offshore wind turbine farm, are fitted with cathodic protection systems as disclosed in relation to the second aspect of the invention and/or FIG. 4, wherein the method further comprises the steps of:
 measuring one or more electrochemical potentials between a first steel support structure and one or more reference electrodes;
 using the measured one or more electrochemical potentials to adapt the first electrical connection of the cathodic protection system fitted to the first steel support structure; and
 using the same measured one or more electrochemical potentials to adapt the first electrical connection of the cathodic protection system fitted to a second steel support structure.

Consequently, by using measurements performed on a first steel support structure to control the cathodic protection system of a second steel support structure (and potentially additional steel support structures e.g. at least 3, 5, or 10 additional steel support structures), effective cathodic protection may be provided to an entire offshore wind farm in a simple and effective manner.

According to a fifth aspect the invention relates to a cathodic protection system for protecting a steel support structure for supporting an offshore wind turbine against corrosion, comprising one or more galvanic anodes for being arranged in connection with the steel support structure and a first electrical connection for electrically connecting the one or more galvanic anodes to the steel support structure whereby the steel support structure can be polarized by the electrons flowing from the one or more galvanic anodes to the steel support structure wherein the cathodic protection system further comprise a control unit configured to periodically measure the electrical current through the first electrical connection and use said measurements of the electrical current to estimate the amount of metal released to the sea from the one or more galvanic anodes.

In some embodiments, the control unit is further configured to estimate the amount of metal left in the one or more galvanic anodes.

According to a sixth aspect, the invention relates to a method for protecting a steel support structure against corrosion, the steel support structure being configured to support an offshore wind turbine, the method comprising the steps of:
 obtaining a cathodic protection system as disclosed in relation to the fifth aspect of the invention;
 arranging the cathodic protection system in connection with the steel support structure;
 electrically connecting the one or more galvanic anodes of the cathodic protection system to the steel support structure using the first electrical connection of the cathodic protection system;
 periodically measure the electrical current through the first electrical connection;
 estimating the amount of metal released to the sea from the one or more galvanic anodes by processing said measurements of the electrical current through the first electrical connection.

The different aspects of the present invention can be implemented in different ways as described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIG. 2 shows an example of a graph of the electrochemical polarization of a steel support structure as a function of depth.

FIG. 3 shows an example of a graph of the electrochemical polarization of a steel support structure as a function of depth.

FIG. 4 shows a schematic drawing of a cathodic protection system for protecting a steel support structure for supporting an offshore wind turbine against corrosion according to an embodiment of the present invention.

FIG. 5 shows a flowchart for a method for protecting a steel support structure against corrosion according to an embodiment of the present invention.

DETAILED DESCRIPTION

Figure 1:
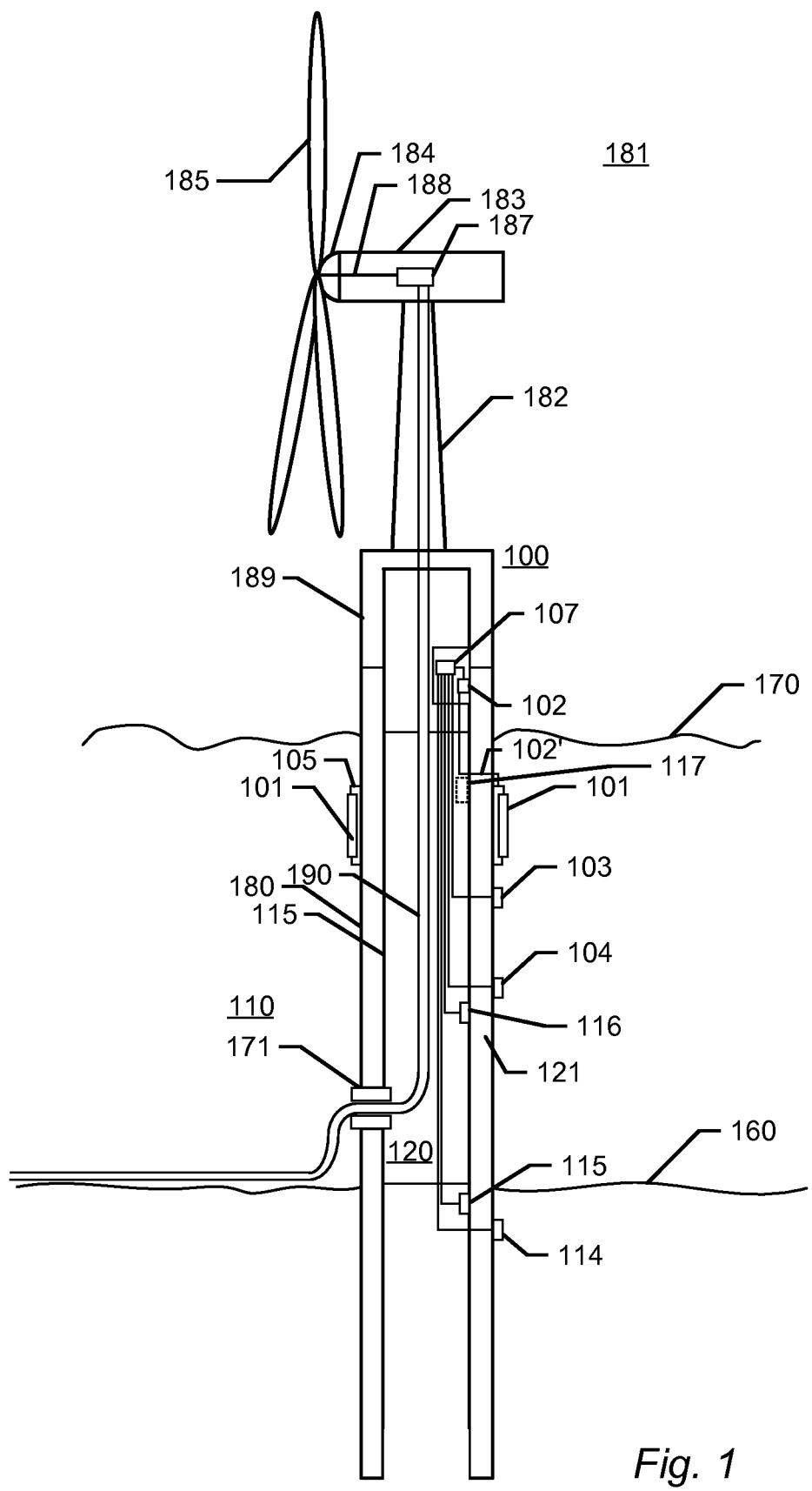
FIG. 1 shows a schematic drawing of an offshore wind turbine arranged on a support system 100 according to an embodiment of the present invention.

In the following description reference is made to the accompanying figures which show by way of illustration how the invention may be practiced.

FIG. 1 shows a schematic drawing of an offshore wind turbine 181 arranged on a support system 100 according to an embodiment of the present invention. FIG. 1 shows a central cross-section. The support system comprises a steel support structure 180 and a cathodic protection system 101-105 configured to protect the steel support structure from corrosion. The wind turbine 181 is a horizontal-axis wind turbine. The wind turbine 181 comprises a tower 182, a nacelle 183, and a rotor hub 184 connected to three rotor blades 185. The rotor blade/rotor hub assembly is connected to a shaft 188 that drives a generator 187. The generator 187 generates electric energy that is provided to the grid via an electric cable 190. The steel support structure 180 is partly submerged in water 170 and partly embedded into the seabed 160. The steel support structure comprises a transition piece 189. The steel support structure has circular wall 121 surrounding a hollow interior 120. The electrical cable 190 may be guided using a guiding device 171 e.g. a j-tube, into a hollow interior 120 of the steel support structure 180 from the exterior water 110. The steel support structure 180 is in this embodiment a monopile structure. The cathodic protection system 101-105 comprises a plurality of galvanic anodes 101 arranged in connection with the steel support structure 180 and a first electrical connection 102 electrically connecting the plurality of galvanic anodes 101 to the steel support structure 180 whereby the steel support structure can be polarized by the electrons flowing from the plurality of galvanic anodes 101 to the steel support structure 180. The plurality of galvanic anodes 101 are arranged in an anode cage 105 that is electrically isolated from the steel support structure 180. The first electrical connection is 102 an adaptable electrical connection that can change the rate of electrons flowing from the plurality of galvanic anodes 101 to the steel support structure and thereby change the polarization of the steel support structure 180. The first electrical connection 102 may be adaptable by comprising a variable resistor connecting the plurality of galvanic anodes 101 to the steel support structure 180.

The cathodic protection system comprises further a control unit 107 operationally connected to the first electrical connection 102 and configured to control the first electrical connection 102 and thereby change the polarization of the steel support structure 108. As an example the control unit 107 may be configured to control the resistance of a variable resistor of the first electrical connection 102, whereby the polarization of the steel support structure may be changed e.g. by increasing the resistance of the variable resistor the polarization may be lowered and by decreasing the resistance of the variable resistor the polarization may be increased.

Alternatively/additionally, the control unit 107 may be configured to control an electrical switch electrically connecting the plurality of galvanic anodes 101 to the steel support structure 180 e.g. the control unit may be configured to control the electrical switch to periodically switch between an open state and a closed state, wherein the control unit may be configured to control the electrical switch to be in the closed state for a larger percentage of the time to increase the polarization and lower percentage of the time to decrease the polarization. The electrical switch may be part of a switched voltage regulator.

The cathodic protection system comprises further a first reference electrode 103 arranged in connection with the steel support structure 180 at a first position and a second reference electrode 104 arranged in connection with the steel support structure 180 at a second position, where the control unit 107 is further operationally connected to the first reference electrode 103 and the second reference electrode 104 and configured to control the first electrical connection 102 in response to the electrochemical potential measured with both the first reference electrode 103 and the second reference electrode 104. This allows the polarization of the steel support structure to be more effectively and precisely controlled. This may further allow the cathodic protection system to take account of changes of steel support structure e.g. deterioration of a coating of the steel support structure. In this embodiment, the cathodic protection system comprises further a third reference electrode 114 arranged below the seabed and operationally connected to the control unit 107, a fourth reference electrode 115 arranged below the seabed in the inside of the steel support structure 180 and operationally connected to the control unit 107, and a fifth electrode 116 arranged in the inside of the steel support structure 180 and operationally connected to the control unit 107.

In this embodiment, the circular wall 121 of steel support structure has a first opening. The first electrical connection 102 comprises a first electrical cable 102' electrically connected at a first end to the plurality of galvanic anodes 101 and extending into the hollow interior 120 through the first opening, wherein the first electrical cable 102' is electrically isolated from the first opening of the steel support structure and electrically connected to another part of the first electrical connection 102 arranged in the hollow interior 120. Consequently, active parts of the cathodic protection system such as switches, variable resistors, and control units can be arranged in the inside of the steel support structure and thereby both better protected and more accessible. The doted box 117 shows an alternative location for the active parts of the first electrical connection 102, i.e. the active parts of the first electrical connection 102 may be located at approximately the same depth as the galvanic anodes 101 whereby the system can be installed with fewer electrical cables arranged in the inside of the steel support structure 180.

The control unit 107 may be configured to estimate a first function based on the electrochemical potential measured with both the first reference electrode 103 and the second reference electrode 104 and control the first electrical connection 102 based on the first function.

The first function may specify the spatial distribution of the electrochemical polarization of the steel support structure. The spatial distribution of the electrochemical polarization may be assumed to only be dependent on the depth, i.e. a function with a single variable (the depth) may specify the electrochemical polarization.

FIG. 2 shows an example of a graph 201 of the electrochemical polarization of a steel support structure as a function of depth, where the axis 202 specifies the electrochemical potential and the axis 203 specifies the depth. The polarization may be measured relative to a reference electrode e.g. a Ag/AgCl/seawater reference electrode. The polarization generally falls as the distance to the cathodic protection system increases (meaning that electrochemical potential becomes less negative). The line 205 shows the maximum electrochemical potential achievable with a particular galvanic anode and the line 204 shows the electrochemical potential required to protect the steel support structure according to norms and standards e.g. if the galvanic anode is made of aluminium the line 205 may correspond to an electrochemical potential of −1050 mV and the line 204 may correspond to an electrochemical potential of −800 mV. The graph 206 shows an example of the electrochemical potential of a steel support structure as function of depth after a first electrical connection of a cathodic protection system according to an embodiment of the present invention has been adapted to lower the electrochemical potential. The first electrical connection may be controlled by a control unit configured to secure that the function is below the threshold given by the line 204 e.g. below −800 mV for a range of depths.

FIG. 3 shows an example of a graph 301 of the electrochemical potential of a steel support structure as a function of depth, where the axis 302 specifies the electrochemical potential and the axis 303 specifies the depth. In this example, the steel support structure has no coating whereby the form of the graph changes. Thus, in embodiments of the invention auxiliary data specifying the state of the coating may be used to control the first electrical connection.

The control unit may have access to first data specifying typical spatial distributions of the electrochemical polarization, and wherein the control unit uses the first data to estimate the first function.

FIG. 4 shows a schematic drawing of cathodic protection system 400 for protecting a steel support structure for supporting an offshore wind turbine against corrosion according to an embodiment of the present invention. The cathodic protection system 400 comprises one or more galvanic anodes 401 for being arranged in connection with the steel support structure and a first electrical connection 402 for electrically connecting the one or more galvanic anodes 401 to the steel support structure. This allows the steel support structure to be polarized by the current flowing from the one or more galvanic anodes 401 to the steel support structure. The first electrical connection 402 is an adaptable electrical connection that can change the rate of current flowing from the one or more galvanic anodes 401 to the steel support structure and thereby change the polarization of the steel support structure. In this embodiment, the galvanic anodes 401 are arranged in an anode cage 405 electrically connected to the first electrical connection 402. The cathodic protection system may further comprise a control unit 407 operationally connected to the first electrical circuit and configured to control the first electrical connection 402 and thereby change the polarization of the steel support structure. The cathodic protection system may further comprise a first reference electrode 403 and a second reference electrode 404 for being arranged in connection with the steel support structure at a first and a second position, where the control unit 407 is further operationally connected to the first reference electrode 403 and the second reference electrode 404 and configured to control the first electrical connection 402 in response to the electrochemical potential measured with both the first reference electrode 403 and the second reference electrode 404. The cathodic protection system 400 may further comprise a communication unit 408 operationally connected to the control unit 407. The control unit 407 may be configured to control the communication unit 408 to transmit a message to a remote receiver if an error or potential future error of the cathodic protection system 400 has been identified. The communication unit 408 may be configured to receive control signals from an external source such as an operator located onshore or on a ship. The control unit 407 may be configured to control the first electrical connection 402 in response to control signals received by the communication unit 408. The communication unit 408 may be a wireless or wired communication unit. The communication unit 408 may be configured to transmit data to a remote receiver. The data may comprise data indicative of measurements made with one or more reference electrodes of the cathodic protection system.

FIG. 5 shows a flowchart of a method 500 for protecting a steel support structure against corrosion according to an embodiment of the present invention. In the first step 501, a cathodic protection system e.g. as disclosed in relation to FIG. 4 is obtained. In the next step 502, the cathodic protection system is arranged in connection with the steel support structure. Then in step 503, one or more galvanic anodes of the cathodic protection system are electrically connected to the steel support structure using a first electrical connection of the cathodic protection system. Next in step 504, one or more electrochemical potentials between the steel support structure and one or more reference electrodes are measured, and finally in step 505 the first electrical connection is adapted using the measured one or more electrochemical potentials e.g. so that the polarization of the steel support structure is sufficient to protect the steel support structure against corrosion while limiting unnecessary emission of anode material into the water.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A support system for supporting an offshore wind turbine comprising:
   a steel support structure for supporting the offshore wind turbine; and
   a cathodic protection system configured to protect the steel support structure from corrosion, the cathodic protection system comprising:

one or more galvanic anodes arranged in connection with the steel support structure; and a first electrical connection electrically connecting the one or more galvanic anodes to the steel support structure, wherein the first electrical connection is an adaptable electrical connection that changes the rate of electrons flowing from the one or more galvanic anodes to the steel support structure;

whereby the steel support structure is polarized by the electrons flowing from the one or more galvanic anodes to the steel support structure, and the polarization of the steel support structure is changed with a change in the rate of electrons flowing from the one or more galvanic anodes to the steel support structure.

2. The support system of claim 1, further comprising a control unit operationally connected to the first electrical connection and configured to control the first electrical connection and thereby change the polarization of the steel support structure.

3. The support system of claim 2, further comprising a first reference electrode arranged in connection with the steel support structure at a first position, wherein the control unit is further operationally connected to the first reference electrode and configured to control the first electrical connection in response to the electrochemical potential measured with the first reference electrode.

4. The support system of claim 3, further comprising a second reference electrode arranged in connection with the steel support structure at a second position, and wherein the control unit is further operationally connected to the second reference electrode and configured to control the first electrical connection in response to the electrochemical potential measured with both the first reference electrode and the second reference electrode.

5. The support system of claim 4, wherein the control unit is configured to estimate a first function related to a spatial distribution of the electrochemical polarization of the steel support structure based on the electrochemical potential measured with both the first reference electrode and the second reference electrode and control the first electrical connection based on the first function.

6. The support system of claim 5, wherein the control unit further has access to auxiliary data related to the spatial distribution of the electrochemical polarization, and wherein the control unit is configured to control the first electrical connection in response to the auxiliary data.

7. The support system of claim 6, wherein the auxiliary data is the state of a coating of the steel support structure.

8. The support system of claim 2, further comprising a communication unit operationally connected to the control unit.

9. The support system of claim 2, wherein the steel support structure has one or more walls surrounding a hollow interior, wherein the one or more galvanic anodes are arranged on the outside of the steel support structure, and wherein the first electrical connection comprises a first electrical cable electrically connected at a first end to the one or more galvanic anodes and extending into the hollow interior, wherein the first electrical cable is electrically isolated from the steel support structure.

10. The support system of claim 9, wherein the first electrical cable is electrically connected at a second end to the control unit.

11. The support system of claim 1, wherein the first electrical connection is adaptable via a variable resistor connecting the one or more galvanic anodes to the steel support structure.

12. The support system of claim 1, wherein the rate of electrons flowing from the one or more galvanic anodes to the steel support structure is changed so that the polarization of the steel support structure is sufficient to protect the steel support structure against corrosion while limiting unnecessary emission of anode material into water adjacent to the steel support structure.

13. A cathodic protection system for protecting a steel support structure for supporting an offshore wind turbine against corrosion, comprising:

one or more galvanic anodes for being arranged in connection with the steel support structure;

a first electrical connection electrically connecting the one or more galvanic anodes to the steel support structure, wherein the first electrical connection is an adaptable electrical connection that changes the rate of electrons flowing from the one or more galvanic anodes to the steel support structure;

a control unit operationally connected to the first electrical connection and configured to control the first electrical connection and thereby change the polarization of the steel support structure;

a first reference electrode arranged in connection with the steel support structure at a first position, wherein the control unit is operationally connected to the first reference electrode and configured to control the first electrical connection in response to the electrochemical potential measured with the first reference electrode; and a second reference electrode for being arranged in connection with the steel support structure at a second position, and wherein the control unit is further operationally connected to the second reference electrode and configured to control the first electrical connection in response to the electrochemical potential measured with both the first reference electrode and the second reference electrode;

whereby the steel support structure is polarized by the electrons flowing from the one or more galvanic anodes to the steel support structure, and the polarization of the steel support structure is changed with a change in the rate of electrons flowing from the one or more galvanic anodes to the steel support structure.

14. The cathodic protection system of claim 13, wherein the steel support structure has one or more walls surrounding a hollow interior, wherein the one or more galvanic anodes are arranged on the outside of the steel support structure, and wherein the first electrical connection comprises a first electrical cable electrically connected at a first end to the one or more galvanic anodes and extending into the hollow interior, wherein the first electrical cable is electrically isolated from the steel support structure.

15. The cathodic protection system of claim 14, wherein the first electrical cable is electrically connected at a second end to the control unit.

16. The cathodic protection system of claim 13, further comprising:

a control unit operationally connected to the first electrical connection and configured to control the first electrical connection and thereby change the polarization of the steel support structure; and a plurality of reference electrodes disposed at various positions of the steel support structure;

wherein the control unit is operationally connected to the plurality of reference electrodes and configured to control the first electrical connection in response to the electrochemical potential measured with the plurality of reference electrodes.

17. The cathodic protection system of claim 13, wherein the rate of electrons flowing from the one or more galvanic anodes to the steel support structure is changed so that the polarization of the steel support structure is sufficient to protect the steel support structure against corrosion while limiting unnecessary emission of anode material into water adjacent to the steel support structure.

18. A method for protecting a steel support structure against corrosion, the steel support structure being configured to support an offshore wind turbine, the method comprising:
 disposing one or more galvanic anodes on the steel support structure;
 measuring one or more electrochemical potentials between the steel support structure and one or more reference electrodes; and
 adaptably changing the rate of electrons flowing from the one or more galvanic anodes to the steel support structure, thereby changing the polarization of the steel support structure.

19. The method of claim 18, further comprising estimating a first function related to a spatial distribution of the electrochemical polarization of the steel support structure based on the electrochemical potential measured with two or more reference electrodes.

20. The method of claim 18, wherein the rate of electrons flowing from the one or more galvanic anodes to the steel support structure is changed so that the polarization of the steel support structure is sufficient to protect the steel support structure against corrosion while limiting unnecessary emission of anode material into water adjacent to the steel support structure.

* * * * *